United States Patent
Kojima et al.

(10) Patent No.: US 10,577,487 B2
(45) Date of Patent: Mar. 3, 2020

(54) THERMOPLASTIC RESIN COMPOSITION, MOLDED ARTICLE, AND MANUFACTURING METHOD OF MOLDED ARTICLE

(71) Applicant: CANON KABUSHIKI KAISHA, Tokyo (JP)

(72) Inventors: Takahiro Kojima, Hiratsuka (JP); Daisuke Kurihara, Kawasaki (JP); Kosuke Nishino, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 15/581,277

(22) Filed: Apr. 28, 2017

(65) Prior Publication Data

US 2017/0321044 A1 Nov. 9, 2017

(30) Foreign Application Priority Data

May 6, 2016 (JP) .................................. 2016-093455
Apr. 12, 2017 (JP) .................................. 2017-079088

(51) Int. Cl.
| | | |
|---|---|---|
| *C08L 9/00* | (2006.01) | |
| *C08L 51/04* | (2006.01) | |
| *C08K 3/34* | (2006.01) | |
| *C08K 3/36* | (2006.01) | |
| *C08K 5/103* | (2006.01) | |
| *C08L 53/02* | (2006.01) | |

(52) U.S. Cl.
CPC ................ *C08L 9/00* (2013.01); *C08K 3/346* (2013.01); *C08K 3/36* (2013.01); *C08K 5/103* (2013.01); *C08L 51/04* (2013.01); *C08L 53/02* (2013.01); *C08L 2201/02* (2013.01); *C08L 2205/06* (2013.01)

(58) Field of Classification Search
USPC ........................................................ 524/426
See application file for complete search history.

(56) References Cited

U.S. PATENT DOCUMENTS

| | | | |
|---|---|---|---|
| 5,179,137 A | 1/1993 | Okamoto et al. | |
| 6,177,512 B1 * | 1/2001 | Gibbons | C08F 279/02 |
| | | | 525/132 |
| 6,852,764 B2 * | 2/2005 | Mlinaric | B65D 39/00 |
| | | | 521/149 |
| 2006/0178543 A1 | 8/2006 | Krupinski et al. | |
| 2007/0299179 A1 * | 12/2007 | Tham | B29B 17/02 |
| | | | 524/300 |
| 2012/0277375 A1 * | 11/2012 | DeAnda | C08F 279/02 |
| | | | 525/53 |

FOREIGN PATENT DOCUMENTS

| | | |
|---|---|---|
| CN | 1083079 A | 3/1994 |
| CN | 1372572 A | 10/2002 |
| CN | 104177747 A | 12/2014 |
| EP | 0 431 941 A1 | 6/1991 |
| JP | 62-70437 A | 3/1987 |
| JP | 8-181541 A | 8/1991 |
| JP | 8-48842 A | 2/1996 |
| JP | 8-120151 A | 5/1996 |
| JP | 9-165487 A | 6/1997 |
| JP | 10-110073 A | 4/1998 |
| JP | 3373310 B2 | 2/2003 |
| JP | 2008-189744 A | 8/2008 |
| JP | 4748965 B2 | 8/2011 |
| TW | 201300432 A1 | 1/2013 |

OTHER PUBLICATIONS

Kurihara et al., U.S. Appl. No. 15/498,701, filed Apr. 27, 2017.
Extended European Search Report in European Application No. 17000769.4 (dated Sep. 15, 2017).
Notification of Reasons for Refusal in Japanese Application No. 2017-079088 (dated Feb. 12, 2019).
Ding Lei, "The Latest Practical Manual for Variety Optimization Selection and Performance Analysis Testing Standards and Application Process of Plastic Additives," vol. I, pp. 520-522 (Oct. 2004).
First Office Action in Chinese Application No. 201710309936.6 (dated Aug. 27, 2019).

* cited by examiner

*Primary Examiner* — Deve V Hall
(74) *Attorney, Agent, or Firm* — Venable LLP

(57) ABSTRACT

An impact resistance is improved and a molding shrinkage percentage is reduced. A thermoplastic resin composition contains: an impact-resistant styrene resin composition which contains polystyrene as a main component and a dispersed rubber phase and in which a volume fraction of the dispersed rubber phase 12 is less than 30%; dispersed phases of elastomer; and particles of a filler. The dispersed phases of the elastomer contains, as a main component, a styrene-butadiene copolymer serving as a linear copolymer constructed by a triblock consisting of a butadiene block and styrene blocks coupled with both ends of the butadiene block.

11 Claims, 3 Drawing Sheets

THERMOPLASTIC RESIN COMPOSITION, MOLDED ARTICLE, AND MANUFACTURING METHOD OF MOLDED ARTICLE

BACKGROUND OF THE INVENTION

Field of the Invention

The present invention relates to a thermoplastic resin composition containing a thermoplastic resin, a molded article, and a manufacturing method of the molded article.

Description of the Related Art

Since an impact-resistant styrene resin composition which is used as a thermoplastic resin is inexpensive, is excellent in terms of flowability and mechanical properties, and further, has a low moisture absorption property, it is used for many parts of electronic equipment such as OA equipment or the like. In order to apply functions such as thermal conductivity, flame resistance, impact resistance, and the like to such an impact-resistant styrene resin composition, an inorganic filler is often mixed as an additive agent. Generally, the larger an amount of filler which is mixed into the thermoplastic resin is, the more the thermal conductivity and flame resistance can be improved.

On the other hand, such a fact that if an addition amount of the filler is small, the impact resistance is improved is known. However, there is such a tendency if the addition amount exceeds a predetermined amount, the impact resistance deteriorates on the contrary. Particularly, such a tendency appears typically in a non-fibrous filler. It is requested to synthetically improve various kinds of physical properties such as an impact resistance and the like are while increasing the addition amount of the filler.

As a composition in which an impact resistance in the case where a filler of high concentration has been filled in the impact-resistant styrene resin composition, the Japanese Patent No. 3373310 proposes a composition in which a volume fraction or the like of a rubber component in such a resin are specified. The Japanese Patent No. 4748965 also proposes a composition having a high impact resistance which is obtained by a method whereby modified elastomer of a copolymer of conjugate diene and vinyl aromatic hydrocarbon is preliminarily melt-kneaded with an inorganic filler and is subsequently kneaded with an olefin series resin.

However, the composition disclosed in the Japanese Patent No. 3373310 has such a problem that although the impact resistance is attained if an amount of rubber component of the impact-resistant styrene resin composition is held to a certain value or more, since a coefficient of linear expansion of the rubber component is higher than that of polystyrene, if the amount of rubber component is large, a molding shrinkage percentage increases. From a viewpoint of the impact resistance, the more the amount of filler is increased, it is necessary to increase the amount of rubber component. There is a relation of trade-off between the improvement of the impact resistance and the increase in molding shrinkage percentage, and both of the improvement of the impact resistance and a decrease in molding shrinkage percentage cannot be satisfied.

On the other hand, according to the composition disclosed in the Japanese Patent No. 4748965, although the impact resistance is improved by contact-wrapping the filler by the modified elastomer, it is made with respect to the olefin series resin and is not made with respect to the impact-resistant styrene resin composition. Therefore, according to the configuration disclosed in the Japanese Patent No. 4748965, when the impact-resistant styrene resin composition is used, both of the improvement of the impact resistance and the decrease in molding shrinkage percentage cannot be satisfied.

SUMMARY OF THE INVENTION

It is, therefore, an aspect of the present invention to improve an impact resistance and reduce a molding shrinkage percentage.

According to an aspect of the present invention, there is provided a thermoplastic resin comprising: an impact-resistant styrene resin composition which contains polystyrene as a main component and a dispersed rubber phase and in which a volume fraction of the dispersed rubber phase is less than 30%; elastomer; and a filler, wherein the elastomer contains, as a main component, a styrene-butadiene copolymer serving as a linear copolymer constructed by a triblock consisting of a butadiene block and styrene blocks coupled with both ends of the butadiene block.

According to another aspect of the present invention, there is provided a thermoplastic resin composition comprising: an impact-resistant styrene resin composition which contains polystyrene as a main component and a dispersed rubber phase and in which a volume fraction of the dispersed rubber phase is less than 30%; elastomer; and a filler, wherein the elastomer contains a styrene-butadiene copolymer as a main component, a part or all of dispersed phases of the elastomer are in contact with the filler, and assuming that a total area of the filler is equal to 1 when seeing a cross section of the thermoplastic resin composition, and among the dispersed phases of the elastomer, a total area of the dispersed phases of the elastomer which are in contact with the filler lies within a range between 0.2 or more and 0.4 or less.

According to the aspect of the present invention, the impact resistance can be improved and the molding shrinkage percentage can be reduced.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

<Structure of Thermoplastic Resin Composition>

A thermoplastic resin composition contains an impact-resistant styrene resin composition (A), elastomer (B), and an inorganic filler (C) as a filler.

Figure 1:
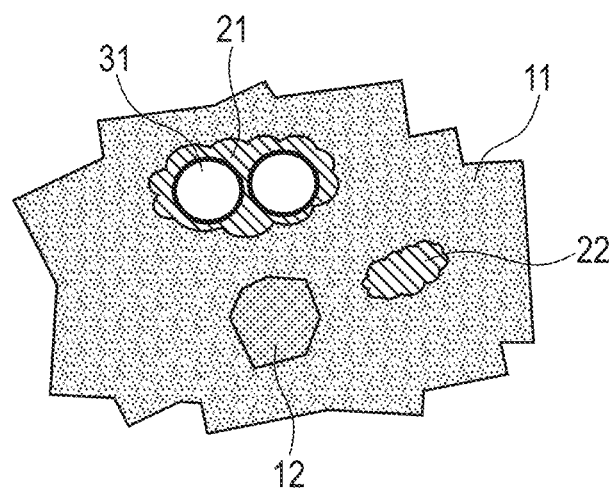
FIG. 1 is a cross sectional view illustrating a schematic construction of a thermoplastic resin composition according to an embodiment.

FIG. 1 is a cross sectional view illustrating a schematic construction of a thermoplastic resin composition according to an embodiment. The impact-resistant styrene resin composition (A) is an impact-resistant styrene resin composition which contains polystyrene 11 forming a resin phase as a main component and a dispersed rubber phase (particles) 12 and in which a volume fraction of the dispersed rubber phase 12 is less than 30%. The elastomer (B) contains, as a main component, a styrene-butadiene copolymer serving as a linear copolymer constructed by a triblock consisting of a butadiene block and styrene blocks coupled with both ends of the butadiene block. The elastomer (B) is formed by dispersed phases 21 and 22. The inorganic filler (C) consists of a plurality of particles 31. A part or all of the dispersed phases 21 and 22 of the elastomer (B) are in contact with the particles 31 of the inorganic filler (C). In the example of FIG. 1, the dispersed phase 21 of the elastomer (B) is in contact with the particles 31 of the inorganic filler (C). The dispersed phase 22 of the elastomer (B) is not in contact with the particles 31 of the inorganic filler (C).

In the thermoplastic resin composition, whether or not the dispersed phase of the elastomer (B) is in contact with the inorganic filler (C) can be discriminated by observing a cross section of a molded article of the thermoplastic resin composition by a transmission electron microscope.

Figure 2:
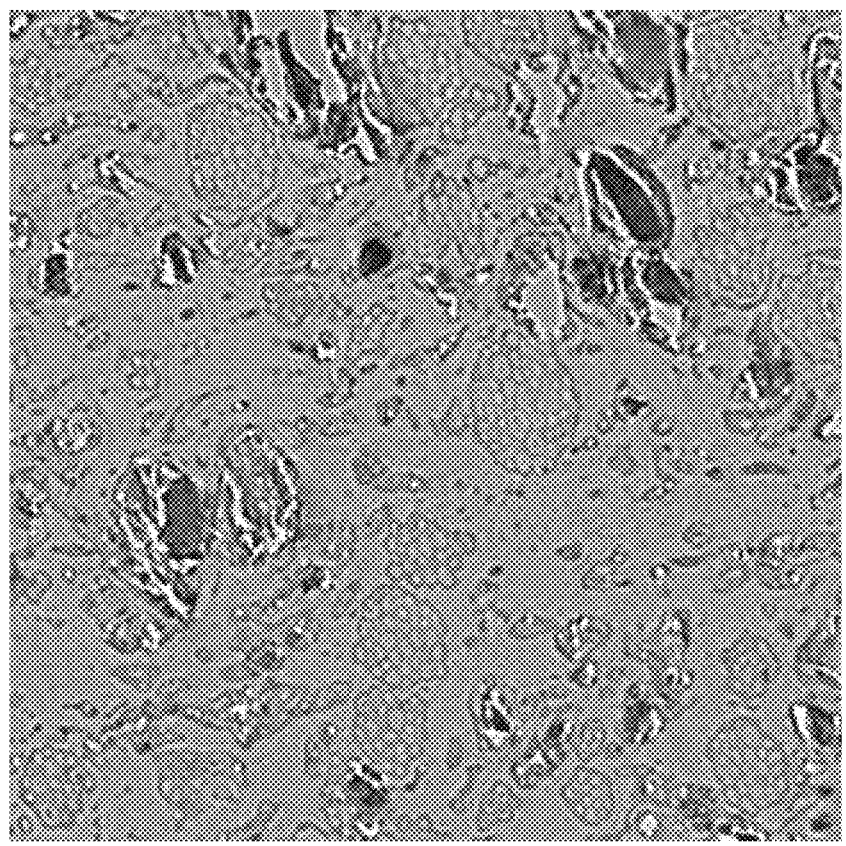
FIG. 2 is a diagram illustrating an image obtained by observing the cross section of the thermoplastic resin composition according to the embodiment by an electron microscope.
Figure 3:
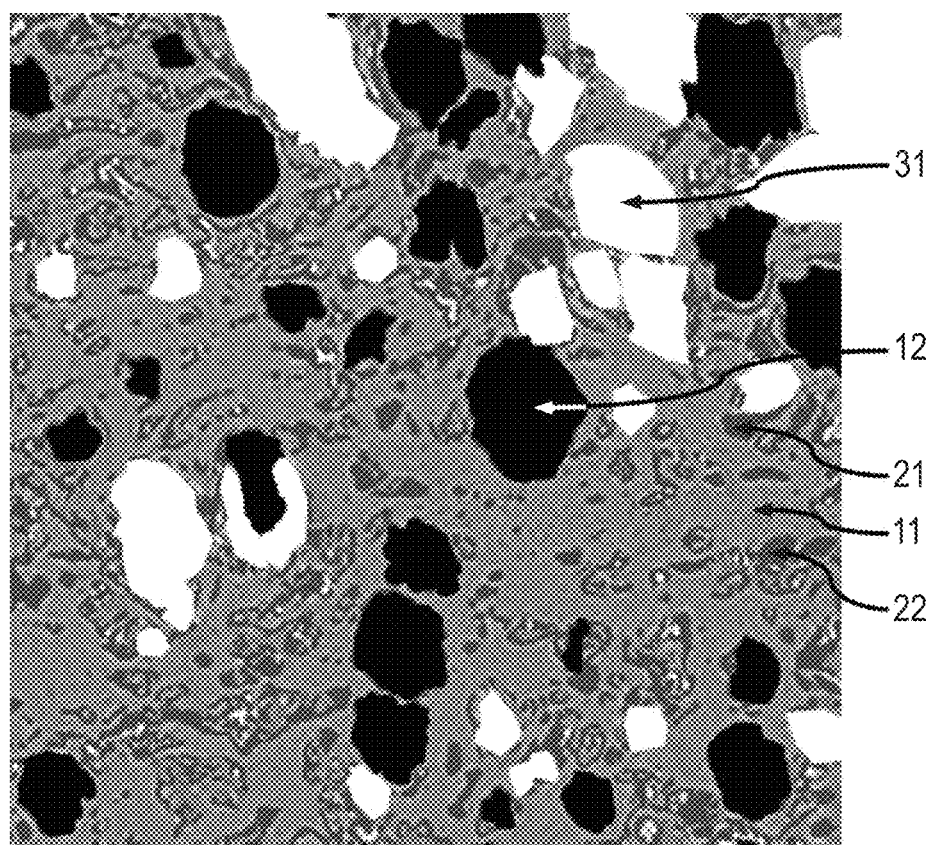
FIG. 3 is a diagram after the image of FIG. 2 was processed.

FIG. 2 is a diagram illustrating an image obtained by observing the cross section of the thermoplastic resin composition according to the embodiment by the electron microscope. FIG. 3 is a diagram after the image of FIG. 2 was processed.

An example of an observing method will be described hereinbelow. An ultrathin slice of about 100 nm is formed from the molded article of the thermoplastic resin composition. A portion containing an aliphatic series C-H structure is chemically dyed by ruthenium tetroxide. Subsequently, the dispersed rubber phase 12 contained in the impact-resistant styrene resin composition (A) and the dispersed phases 21 and 22 of the elastomer (B) are secondary-dyed by osmium tetroxide. Then, the slice is evaporation-deposited by carbon or the like and is subsequently measured by the transmission electron microscope, so that a structure of the thermoplastic resin composition containing the resin phase can be observed. The order of two steps of the ultrathin slice forming step and the chemical dyeing step may be exchanged in accordance with a fragility of the resin and a penetrating speed of the dying agent.

In order to relieve a stress which is generated at an interface between an organic component and the inorganic filler (C) when an impact is applied to the molded article formed by the thermoplastic resin composition, it is necessary to widen a contacting area between the dispersed phase 21 of the elastomer (B) and the particles 31 of the inorganic filler (C). Therefore, it is important to induce such a structure that the dispersed phase 21 of the elastomer (B) has more number of contacting points or contacting surfaces with the particles 31 of the inorganic filler (C) without accidentally making the dispersed phase 21 of the elastomer (B) come into contact with the particles 31 of the inorganic filler (C).

The following method can be used in order to evaluate an extent of the contacting area. First, the structure of the thermoplastic resin composition is observed (imaged) by the transmission electron microscope by the above method (refer to FIG. 2). Subsequently, a portion of the inorganic filler (C) which is not chemically dyed, a portion of the dispersed rubber phase 12 which was secondary-dyed, and the dispersed phases 21 and 22 of the styrene-butadiene copolymer which were secondary-dyed are extracted (refer to FIG. 3) and their areas are calculated by the image process. Commercially available image analyzing, image measuring, and image processing software can be used for the calculation of the areas by the image process.

Since a hardness of the inorganic filler is generally high, when a cross section of an ultrathin slice serving as an observation target is formed, there is a case where a fragment noise such as carbon or the like in which the inorganic filler was fallen out and which has been evaporation deposited is formed. Since an undyed contour is observed on the fallout scar, a portion within a range of the contour line may be also included in an area of the inorganic filler. Such a fallout phenomenon of the inorganic filler can be reduced by processing the ultrathin slice under a freezing condition of liquid nitrogen or the like.

There is also a case where the dispersed rubber phase contained in the impact-resistant styrene resin composition (A) is contact-wrapped to the dispersed phase of the elastomer (B) and it is difficult to distinguish the areas of both of those phases. In such a case, it is considered that when an impact is applied, a stress which is applied to the dispersed phase of the elastomer (B) is propagated to the dispersed rubber phase and is relieved. An area of the contact-wrapped dispersed rubber phase may be included in an area of the dispersed phase of the styrene-butadiene copolymer.

The phase structure of the thermoplastic resin composition is observed by the foregoing method. Assuming that a total area of the particles 31 of the inorganic filler (C) is equal to 1, a value of a relative total area of the dispersed phase 21 of the elastomer (B) which is in contact with the particles 31 of the inorganic filler (C) is calculated. It is desirable that a calculation value of the relative total area of the elastomer (B) which is in contact with the inorganic filler (C) to the total area of the inorganic filler (C) at the time of seeing the cross section of the thermoplastic resin composition lies within a range between 0.2 or more and 0.4 or less.

If the calculation value is smaller than 0.2, a total contacting area between the elastomer (B) and the inorganic filler (C) is small. Therefore, the stress generated at the interface between the resin phase 11 and the particles 31 of the inorganic filler (C) cannot be sufficiently relieved and an impact value of the molded article made of the thermoplastic resin composition is small. If the calculation value exceeds 0.4, a state where an ambience of the particles 31 of the inorganic filler (C) is thickly covered with the dispersed phase 21 of the elastomer (B) is obtained. In this case, even if a coefficient of linear expansion of the inorganic filler (C) is small, an influence on the thermoplastic resin composition is low and there is such a risk that a molding shrinkage percentage of the thermoplastic resin composition increases.

From a viewpoint of the impact resistance, particularly, if the inorganic filler (C) is calcium carbonate, it is desirable that the calculation value lies within a range between 0.27 or more and 0.37 or less. Since the stress generated at the interface between the resin and the inorganic filler when the impact is applied can be effectively relieved under such a condition, the thermoplastic resin composition in which the impact resistance is improved (impact value is large) can be obtained.

The phase structure of the thermoplastic resin composition is observed by the foregoing method. Assuming that a total area of the whole dispersed phase 21 of the elastomer (B) is equal to 1, a value of the total area of the dispersed phase 21 of the elastomer (B) which is in contact with the inorganic filler (C) is calculated. It is desirable that a calculation value of the relative total area of the elastomer (B) which is in contact with the inorganic filler (C) to the area of the whole elastomer (B) at the time of seeing the cross section of the thermoplastic resin composition lies within a range between 0.18 or more and 1 or less.

If the calculation value is smaller than 0.18, an existence ratio of the dispersed phase 22 of the elastomer (B) which is not in contact with the inorganic filler (C) is large and this means that an efficient layout is not formed with respect to the improvement of the impact resistance. In this case, in order to obtain the high impact resistance, it is necessary to increase a rate of the elastomer (B) or decrease a rate of the inorganic filler (C). There is such a risk that a decrease in weight deflection temperature of the molded article of the thermoplastic resin composition, an increase in molding shrinkage percentage, or the like is caused. Particularly, from a viewpoint of the impact resistance, the larger a rate at which the elastomer (B) is in contact with the particles of the inorganic filler (C) in the dispersed phase of the elastomer (B) is, it is better. Therefore, it is more desirable that the calculation value lies within a range between 0.20 or more and 1 or less.

It should be particularly noted that the elastomer (B) contains, as a main component, the styrene-butadiene copolymer serving as a linear copolymer constructed by a tri-block consisting of the butadiene block and the styrene blocks coupled with both ends of the butadiene block. Since the styrene-butadiene copolymer is contained as a main component, such a structure that the elastomer (B) and the inorganic filler (C) are in contact with each other is induced and a balance of physical properties between the impact resistance and the molding shrinkage percentage can be accomplished.

Constituting components of each of the impact-resistant styrene resin composition (A), elastomer (B), and inorganic filler (C) will be described in detail hereinbelow.

<Impact-Resistant Styrene Resin Composition (A)>

The impact-resistant styrene resin composition (A) is constructed by polystyrene as a main component and contains the dispersed rubber phase which is formed by copolymerizing or dispersing a rubber-like elastic body into a resin, and a volume fraction of the dispersed rubber phase is less than 30%.

Although a high molecular polymer component other than polystyrene and the rubber-like elastic body may be contained in the impact-resistant styrene resin composition (A), it is desirable that an amount of high molecular polymer is less than 30 weight % to the whole impact-resistant styrene resin composition (A). As a component of the high molecular polymer component other than polystyrene and the rubber-like elastic body, a styrene copolymer with acrylonitrile or the like or polyphenylene ether (PPE) can be typically mentioned.

In order to control a weight deflection temperature of the molded article of the thermoplastic resin composition, it is desirable that those compounds are contained within a range of concentration between 0 weight % or more and a value less than 30 weight % to the whole resin, and a concentration of 20 weight % or less is more desirable. If the concentration is equal to 30 weight % or more, there is such a risk that the molding flowability which polystyrene inherently has is deteriorated.

Although the rubber-like elastic body is not particularly limited, for example, a butadiene rubber, a styrene butadiene rubber, an acrylic rubber, an acrylonitrile butadiene rubber, a natural rubber, or the like can be mentioned. From a viewpoint of an affinity with the styrene resin, a butadiene rubber, a styrene butadiene rubber, or an acrylonitrile butadiene rubber is particularly desirably used.

There is a case where the dispersed rubber phase in the impact-resistant styrene resin composition (A) has such a salami structure that unreactive polystyrene or polystyrene which reacted to the rubber-like elastic body is finely dispersed into the rubber-like elastic body. Polystyrene which was finely dispersed is also included in the volume of the salami structure. Therefore, a fraction of the dispersed rubber phase in the resin does not always coincide with the weight concentration of the rubber-like elastic body in the resin.

Such a volume fraction of the dispersed rubber phase can be obtained by an area ratio of the phase structure at the time when the impact-resistant styrene resin composition is observed by the transmission electron microscope. As an example, an ultrathin slice of about 50 to 100 nm is formed from the molded article of the thermoplastic resin composition and a rubber-like elastic body component is chemically dyed by osmium tetroxide or the like. Subsequently, the slice is observed by the transmission electron microscope and a phase structure is imaged. A portion of the dispersed rubber phase is cut away and its area is calculated by an image process. By obtaining a ratio, as a percentage, of the area of the dispersed rubber phase to the whole area of the image, it can be used as a volume fraction of the dispersed rubber phase.

The volume fraction of the dispersed rubber phase exceeds 0% and is less than 30%. If the fraction of the dispersed rubber phase is equal to 30% or more, a molding shrinkage percentage at the time when the thermoplastic resin composition is molded is large and a desired molding precision cannot be obtained. It is more desirable that the volume fraction of the dispersed rubber phase is equal to 25% or less.

Any one of commercially available articles and their mixture can be also used as an impact-resistant styrene resin composition. For example, there are PSJ-Polystyrene (product name) made by PS Japan Co., Ltd., Toyo Styrol (product name) made by Toyo Styrene Co., Ltd., Dick Styrene (product name) made by DIC Co., Ltd., NORYL (registered trademark) Resin (product name) made by SABIC Co., Ltd., and the like.

Various kinds of additive agents may be preliminarily mixed into the impact-resistant styrene resin composition in accordance with necessity. As various kinds of additive agents, a flame retarder or wax of a bromo series, a chlorine series, a phosphorus series, an inorganic series, or the like, various kinds of fatty acids, a lubricant/mold releasing agent such as fatty acid amide, fatty acid ester, metallic salt of a fatty acid, or the like, and the like can be mentioned. In addition, as various kinds of additive agents, an ultraviolet ray absorbent such as benzotriazole series compound, benzophenone series compound, phenyl salicylate compound, or the like, a hindert amine series stabilizer, an antioxidant of a phenol series or a phosphorus series, and the like can be mentioned. Further, as various kinds of additive agents, a heat stabilizer of a tin series, various kinds of antistatic agents, a slidability improver such as polysiloxane or the like, coloring agents such as various kinds of pigments or dyes represented by titanium oxide, carbon black, and the like, and the like can be mentioned.

<Elastomer (B)>

The elastomer (B) contains, as a main component, a styrene-butadiene block copolymer serving as a linear copolymer constructed by a triblock consisting of a butadiene block and styrene blocks coupled with both ends of the butadiene block.

The styrene-butadiene block copolymer denotes a copolymer other than the rubber-like elastic body contained in the impact-resistant styrene resin composition (A). Specifically speaking, it is a block copolymer of a polymer block of a styrene series compound (hereinbelow, referred to as "S") and a polymer block of a butadiene series compound (hereinbelow, referred to as "B").

As for a layout structure of the block copolymer consisting of a binary system, a structure having a linear structure and a structure having a branch (branch, radial) structure are generally known. The block copolymer has the linear structure as a main component. The main component of the block copolymer denotes a component having a content larger than 50 weight % to the whole weight of the elastomer (B).

A random copolymer of the styrene series compound and the butadiene series compound may be contained in the copolymer of the linear structure. However, it is assumed that a ratio at which the block copolymer consisting of the triblock occupies is larger than a ratio at which the random copolymer occupies.

As a block copolymer of the linear structure, it can have a variety of structures such as diblock copolymer of S-B, triblock copolymer of S-B-S or B-S-B, higher-order block copolymer in which an intermediate chain consists of a plurality of blocks and S is coupled with both ends of the intermediate chain, and the like. Among those block copolymers, in the embodiment, it is assumed that the triblock copolymer of S-B-S has a content larger than ⅓ to the whole weight of the elastomer (B).

It is important here that the triblock copolymer of S-B-S is a main component when a structure in which the elastomer (B) and the inorganic filler (C) are in contact with each other appears in the thermoplastic resin composition. Although its mechanism is not clarified yet, it is considered that it largely depends on its microphase separation structure.

As for the triblock copolymer of S-B-S, it is known that the microphase separation structure in which polystyrene domains which are formed by S parts of a plurality of molecules exist is formed in a butadiene matrix phase which is formed by interwinding B parts of a plurality of molecules. In the structure of S-B-S, since both ends are stereoscopically restricted in the S part, the interwinding of the B parts is restricted, and since the intermediate chain is formed by a single block, the relatively soft elastomer in which domain sizes are minute and uniform is obtained. According to such elastomer, since its form is freely deformed and the number of concave/convex portions of an interface with another component is small, it can be expected that contacting surfaces are more efficiently formed.

Therefore, even if a master batch process for preliminarily contact-wrapping the inorganic filler by elastomer is not executed in a manufacturing step, by using the triblock copolymer of S-B-S as elastomer (B), the contacting area between the elastomer (B) and the inorganic filler (C) can be assured.

The styrene series compound denotes an aromatic vinyl compound such as styrene, α-methyl styrene, vinyl toluene, vinyl xylene, or the like and, more desirably, it is styrene. The butadiene series compound denotes a conjugate diene series compound such as 1,3-butadiene, 2-methyl-1, 3-butadiene (isoprene), or the like and, more desirably, it is 1,3-butadiene.

In the styrene-butadiene copolymer, it is desirable that a ratio at which repetition units derived from the butadiene series compound occupy among all repetition units lies within a range between 30 weight % or more and 90 weight % or less and, more desirably, between 50 weight % or more and 80 weight % or less. If such a ratio is larger than 90 weight %, since a content of the structure derived from the styrene series compound is small, an affinity to the impact-resistant styrene resin composition (A) is low, a dispersibility deteriorates, and an impact value is liable to decrease. On the other hand, if such a ratio is smaller than 30 weight %, since an elasticity of the styrene-butadiene copolymer itself is small, a reinforcing effect is weakened and the impact value is liable to decrease. Particularly, within a range between 50 weight % or more and 80 weight % or less, the thermoplastic resin composition can exhibit a high impact resistance (impact value).

Although unsaturated bonds exist in the fat chain derived from the butadiene series compound of the block copolymer, a part of the unsaturated bonds may be reduced by hydrogenation or may be reacted to another reactive compound. However, in order to cause a structure peculiar to the thermoplastic resin composition, it is desirable that the unsaturated bonds remain from a viewpoint of affinity to the dispersed rubber phase contained in the impact-resistant styrene resin composition (A) and the inorganic filler (C). It is desirable that a survival rate of the unsaturated bonds is larger than 95% (for example, in case of a hydrogenation ratio, it is less than 5% and in case of a modification ratio, it is less than 5%). Particularly, if they have been reacted to another reactive compound and modified, since inherent physical properties of the block copolymer change, there is such a risk that a water absorption ratio of the thermoplastic resin composition increases or the like. It is, therefore, desirable to use the unhydrogenated and unmodified block copolymer.

In the elastomer (B), it is desirable that a tensile elongation at break of a single body is equal to 600% or more and, more desirably, 890% or more. In the case of using the elastomer (B) having the tensile elongation at break of 890% or more, when an impact is applied to a molded article obtained by molding the thermoplastic resin composition, a structure in which the dispersed phase of the elastomer (B) is extended in a craze-like shape is formed and the impact can be more efficiently relieved. The tensile elongation at break of the copolymer single body can be obtained by measuring its film by a tensile tester in accordance with a well-known testing method (ASTM testing method D412 or the like).

As elastomer (B), commercially available articles or their mixture can be used. For example, among Thermoplastic Elastomer TR (product name) Series made by JSR Co., Ltd., D Polymer (product name) made by Kraton Co., Ltd., and Asaprene (registered trademark)•Tufprene (registered trademark) made by Asahikasei Chemicals Co., Ltd., elastomer containing S-B-S as a main component can be selected from the respective grades.

<Inorganic Filler (C)>

The inorganic filler shown as an inorganic filler (C) is not particularly limited but a well-known inorganic filler can be used irrespective of a shape such as plate-like shape, fibrous shape, granular shape, or the like. As specific examples of the inorganic filler (C), a metal oxide, a metal hydroxide, carbonate, sulfate, a silicate compound, a glass series filler, a silic acid compound, a ferrite class, a graphite class, and the like can be mentioned. As a metal oxide, alumina, a zinc oxide, a titanium oxide, a cerium oxide, a calcium oxide, a magnesium oxide, an iron oxide, a tin oxide, an antimony oxide, and the like can be mentioned. As a metal hydroxide, a calcium hydroxide, a magnesium hydroxide, an aluminum hydroxide, and the like can be mentioned. As carbonate, basic magnesium carbonate, calcium carbonate, magnesium carbonate, zinc carbonate, barium carbonate, dawsonite, hydrotalcite, and the like can be mentioned. As sulfate, calcium sulfate, barium sulfate, magnesium sulfate, gypsum fiber, and the like can be mentioned. As a silicate compound, calcium silicate (wollastonite, xonotlite, or the like), talc, clay, mica, montmorillonite, bentonite, activated clay, sepiolite, imogolite, sericite, kaoline, vermiculite, smectite, and the like can be mentioned. As a glass series filler, glass fiber, milled glass fiber, glass beads, glass flake, glass balloon, and the like can be mentioned. As a silic acid compound, silica (white carbon, or the like), quartz sand, and the like can be mentioned.

The inorganic filler (C) contained in the thermoplastic resin composition may be constructed by one kind or two or more kinds of materials. The inorganic filler (C) may be a filler whose surface has previously been treated by any one of a silane coupling agent, a titanium coupling agent, various kinds of finishing agents such as organic fatty acid, alcohol, amine, and the like, a wax, a silicone resin, and the like. As an inorganic filler (C), it is desirable to use calcium carbonate, wollastonite, graphite class, or the like.

Particularly, in the case of using the calcium carbonate, since a hardness of particles is high, a thermoplastic property of a high impact resistance can be obtained. As for calcium carbonate, since a shape anisotropy of the filler is small, a thermoplastic resin in which an anisotropy of the molding shrinkage is small can be obtained. In the case of using wollastonite, since its fiber shape is oriented, the impact resistance can be further raised. The molding shrinkage in a specific direction can be more effectively reduced. In the case of using the graphite class whose thermal conductivity is high, a cooling time at the time of injection molding is reduced and a molding cycle time can be decreased. More desirably, a plurality of ones of those materials can be combined and used.

As for calcium carbonate, its manufacturing method and structure, components contained as impurities, and the like are not particularly limited. Synthetic calcium carbonate (sedimentating calcium carbonate) or natural-derived heavy calcium carbonate can be used. As calcium carbonate, a commercially available article may be used. For example, NS (product name) Series made by Nitto Funka Industries Co., Ltd., Vigot (registered trademark)•Shiroenka (registered trademark)•Whiton (registered trademark) made by Shiraishi Industries Co., Ltd., and the like can be mentioned.

A mean particle diameter of calcium carbonate can be measured by a laser diffraction type particle size distribution measuring apparatus. Although the mean particle diameter of calcium carbonate is not particularly limited, it is desirable that it lies within a range between 0.01 μm or more and 30 μm or less and, more desirably, between 0.3 μm or more and 10 μm or less. By setting the mean particle diameter to a value within such a predetermined range, a fallout of the inorganic filler at the time when a contact friction occurs on the surface of the molded article is prevented, and a thermoplastic resin composition having a melt viscosity suitable for injection molding can be obtained. Such a thermoplastic resin composition can be particularly suitably used as a material of the molded article in which a frequency at which it is come into contact with the user's hand is large.

Wollastonite is commercially available as an article in a needle-like or block-like shape obtained by finely grinding natural-derived silicate minerals (wollastonite). There are various kinds of articles in which fiber diameters, fiber lengths, and aspect ratios are different, respectively. As commercially available articles, for example, Wollastonite Short Fiber Grade K (product name) Series, Long Fiber Grade H (product name) Series, and Fine Fiber Grade KF (product name) Series made by Keiwa Rozai Co., Ltd., Wollastonite Fine Grade KAP (product name) Series and Fine Grade KG (product name) Series made by Maruto Co., Ltd., Wollastonite (product name) made by NYCO Minerals Co., Ltd., and the like can be mentioned.

Although an average fiber length of wollastonite is not particularly limited, it is desirable that it lies within a range between 0.02 μm or more and 100 μm or less and, more desirably, between 1 μm or more and 50 μm or less. By setting the average fiber length to a value within such a predetermined range, a fallout of the inorganic filler at the time when a contact friction occurs on the surface of the molded article is prevented, and a thermoplastic resin composition having a melt viscosity suitable for injection molding can be obtained. Such a thermoplastic resin composition can be particularly suitably used as a material of the molded article in which a frequency at which it is come into contact with the user's hand is large.

<Ratio of Components of (A) to (C)>

In the thermoplastic resin composition, with respect to a weight fraction of a component which occupies in all components of the thermoplastic resin composition, it is desirable that the weight fraction of the impact-resistant styrene resin composition (A) lies within a range between 40 weight % or more and a value less than 80 weight %. It is also desirable that the weight fraction of the elastomer (B) lies within a range of 10 weight % or less (exceeding 0 weight %). It is also desirable that the weight fraction of the inorganic filler (C) lies within a range between a value larger than 20 weight % and 50 weight % or less.

If the weight fraction of the impact-resistant styrene resin composition (A) is smaller than 40 weight %, there is such a risk that a flowability and mechanical properties which the impact-resistant styrene series of the impact-resistant styrene resin composition (A) inherently has are deteriorated. If the weight fraction of the impact-resistant styrene resin composition (A) is larger than 80 weight %, since an addition amount of the inorganic filler (C) is small, there is such a risk that an improving effect of a function owing to the addition of an inorganic additive agent of the inorganic filler (C), for example, a reducing effect of the molding shrinkage percentage is deteriorated.

As for the elastomer (B), since a thermal deformation temperature is lower than that of the impact-resistant styrene series, if its content exceeds 10 weight %, there is such a risk that the weight deflection temperature of the molded article of the thermoplastic resin composition decreases.

If the weight fraction of the inorganic filler (C) is equal to 20 weight % or less, the improving effect of the function owing to the addition of the inorganic filler (C), particularly, the reducing effect of the molding shrinkage percentage is deteriorated. It is more desirable that the weight fraction is equal to 30 weight % or more. If the weight fraction of the inorganic filler (C) exceeds 50 weight %, the flowability and mechanical properties which the impact-resistant styrene series of the impact-resistant styrene resin composition (A) inherently has are deteriorated. It is more desirable that the weight fraction is equal to 40 weight % or less.

A constitution ratio of the thermoplastic resin composition of the invention can be known by combining the well-known separating technique and analyzing technique.

Although its method and procedure are not particularly restricted, for example, components of a solution obtained by extracting an organic component from the thermoplastic resin composition are separated by various kinds of chromatographies or the like and, thereafter, a component analysis can be progressed.

In order to extract the organic component from the thermoplastic resin composition, it is sufficient that the thermoplastic resin composition is dipped into a solvent which can dissolve the organic component and is dissolved. By preliminarily finely grinding the thermoplastic resin composition or heat-stirring the solvent, a time necessary to extract can be decreased.

Although the solvent which is used can be arbitrarily selected in accordance with a polarity of the organic component constructing the thermoplastic resin composition, an aromatic solvent such as toluene, xylene, or the like, or a solvent such as tetrahydrofuran, dioxane, methylene chloride, chloroform, N-methyl pyrolidone, or the like is desirably used. Those solvents may be mixed at an arbitrary ratio and used.

By drying a remainder which remains after the organic component was separated and weighing, a content of the inorganic component contained in the thermoplastic resin composition can be known. As another method of knowing the content of the inorganic component in the thermoplastic resin composition, there is also a method whereby the temperature is raised to a decomposition temperature of the resin or higher by a thermo-gravimetric analysis (TGA) or the like and an ash component is quantitated.

By performing a fluorescent X-ray spectroscopy of a sample obtained by drying the remainder which remains after the organic component was extracted, elements contained in the inorganic component and a constitution ratio of them can be known.

Components can be separated by any one of methods such as various kinds of chromatography methods and the like from a solution in which the organic component has been extracted from the thermoplastic resin composition. A class of an additive of a low molecular weight can be separated by a gas chromatography (GC) or a high pressure liquid phase column chromatography (HPLC). A copolymer of a high molecular weight can be separated by a gel permeation chromatography (GPC) or the like. Particularly, if a cross linking copolymer or gel of a large molecular weight is contained or if micell is formed in the liquid, the separation by a centrifugation or the separation by a semi-permeable membrane can be also selected.

The separated organic component can be analyzed by a well-known analyzing method such as nuclear magnetic resonance (NMR) spectrum measurement, infrared absorption (IR) spectrum measurement, Raman spectrum measurement, mass spectrum measurement, element analysis, or the like.

As for the copolymer of a high molecular weight, although a structure analysis is generally complicated as compared with that of an organic substance of a low molecular weight, structure information can be obtained by selecting a proper analyzing method and executing a proper analysis pre-treatment.

For example, in the case of the styrene-butadiene copolymer, since an absorption derived by an aromatic ring of styrene and a double bond of butadiene and a chemical shift due to a difference of chemical environment of methylene chains are observed by a nuclear magnetic resonance (13C-NMR) spectrum and an IR spectrum of a carbon isotope, structure information such as a copolymer ratio and the like can be obtained.

The double bond of butadiene is cut by an ozone addition reaction and a reducing agent treatment subsequent thereto and a high molecular chain can be decomposed (ozonolosys) to low molecular branches. By separating its treated substance by any one of the foregoing various kinds of chromatography methods and analyzing by the foregoing analyzing method of the copolymer, structure information such as a ratio between a straight chain and branching and the like can be obtained.

<Manufacturing Method of Thermoplastic Resin Composition>

A manufacturing method of the thermoplastic resin composition is not limited to a specific method but a mixing method which is generally used with respect to the thermoplastic resin can be used. For example, the thermoplastic resin composition can be manufactured by mixing and kneading such a resin by a mixer such as tumbler, V-type blender, Banbury mixer, kneading roll, kneader, uniaxial extruder, multiaxial extruder of two or more axes, or the like. Particularly, the melt kneading by a biaxial extruder is excellent in terms of productivity.

In the manufacturing of the thermoplastic resin composition, a plurality of components among the impact-resistant styrene resin composition (A), the elastomer (B), the inorganic filler (C), and other additive agents which are used in accordance with necessity may be preliminarily mixed or kneaded or may be simultaneously mixed or kneaded. Particularly, in the manufacturing by the extruder, an individual feeder is provided for every component and the kneading in which the addition is successively performed can be also executed in the extruding step. However, since the thermoplastic resin composition has such a construction that a structure in which the elastomer (B) is come into contact with the circumference of the inorganic filler (C) is induced, even when they are simultaneously kneaded, the high impact resistance (impact value) can be obtained.

As other additive agents, a lubricant/mold releasing agent such as fatty acid amide, fatty acid ester, metallic salt of a fatty acid, or the like, an ultraviolet ray absorbent such as benzotriazole series compound, benzophenone series compound, phenyl salicylate compound, or the like, a hindert amine series stabilizer, and the like can be mentioned. In addition, as other additive agents, an antioxidant of a phenol series or a phosphorus series, a heat stabilizer of a tin series, various kinds of antistatic agents, a slidability improver such as polysiloxane or the like, coloring agents such as various kinds of pigments or dyes represented by titanium oxide, carbon black, and the like, and the like can be mentioned. Further, as other additive agents, a silane coupling agent, a titanium coupling agent, various kinds of finishing agents such as organic fatty acid, alcohol, amine, and the like, a wax, a silicone resin, and the like can be mentioned.

Among them, the lubricant/mold releasing agent such as fatty acid amide, fatty acid ester, metallic salt of a fatty acid, or the like, the silane coupling agent, the titanium coupling agent, the various kinds of finishing agents such as organic fatty acid, alcohol, amine, and the like, the wax, and the silicone resin can be effectively used as processing aids. If those processing aids were added, not only a temperature at the time of melt-kneading is decreased and a thermal decomposition of the thermoplastic resin composition can be suppressed but also a dispersion of the inorganic filler (C) can be promoted. Among them, polyfatty acid amide or polyfatty acid ester class in which an amine group, a carboxylic acid group, or a hydroxyl group remains in a part of molecules can be particularly desirably used as processing aids. In such a polyfatty acid amide or a polyfatty acid ester class, the amine group, carboxylic acid group, or hydroxyl group interacts on the inorganic filler (C) and effectively covers the surface of the inorganic filler (C). At the same time, since the fatty acid structure exhibits an affinity to the elastomer (B) as well, it is possible to expect that the contact of the inorganic filler (C) and the elastomer (B) is promoted.

It is desirable that an addition amount of those processing aids is equal to 10 weight % or less to the obtained thermoplastic resin composition and, more desirably, 5 weight % or less. If the addition amount of those processing aids is large, there is a case where the processing aids flow out of the molded article which is obtained.

In the case of preliminarily mixing the foregoing additive agents to one or a plurality of ones of the impact-resistant styrene resin composition (A), the elastomer (B), and the inorganic filler (C), it is sufficient to process by a dry method or a wet method. In the dry method, they are stirred by using an agitator such as Henschel mixer, ball mill, or the like. In the wet method, a thermoplastic resin is added to a solvent and stirred and, after the mixture, the solvent is eliminated. Particularly desirably, the wet method is used.

In the manufacturing by the melt-kneading, a kneading temperature, a kneading time, and a feeding speed can be arbitrarily set in accordance with a kind and performance of a kneading apparatus and properties of the impact-resistant styrene resin composition (A), the elastomer (B), the inorganic filler (C), and components of other additive agents which are used in accordance with necessity. Ordinarily, the kneading temperature lies within a range of 150 to 300° C., desirably, 170 to 270° C., more desirably, 190 to 250° C. If such a temperature is too low, the dispersion of the inorganic filler (C) is obstructed. If such a temperature is too high, a thermal decomposition of the impact-resistant styrene resin composition (A) and the elastomer (B) becomes a problem and there is such a risk that a deterioration of various kinds of physical properties and a defect of an external appearance of the molded article occur.

Figure 5:
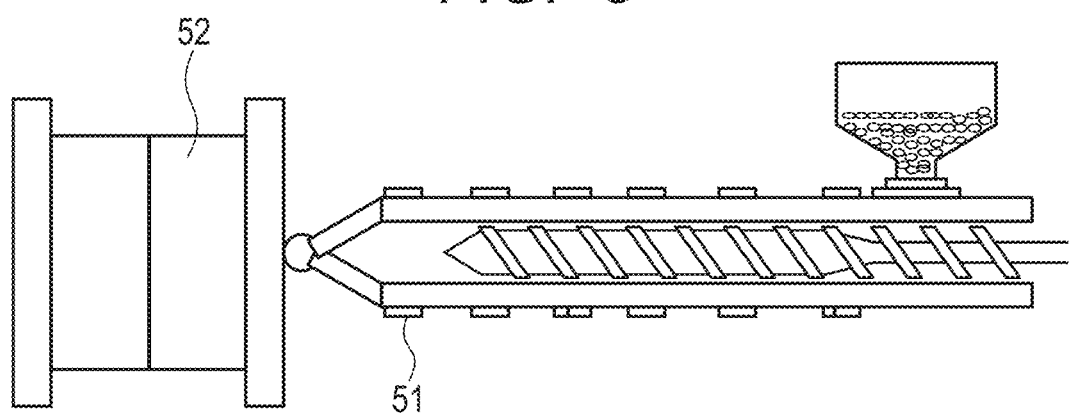
FIG. 5 is a diagram for describing a manufacturing method of a molded article according to the embodiment.

The thermoplastic resin composition obtained by the foregoing manufacturing steps can be easily molded by a molding method such as extrusion molding, injection molding, compression molding, or the like which is generally used, and it can be also applied to a blow molding, a vacuum molding, a bicolor molding, or the like. For example, in the case of the injection molding, the molded article is manufactured by injecting a resin into a die 52 from an injection molding machine 51 as illustrated in FIG. 5. The molded article is applied as parts of OA equipment and other electric/electronic equipment or parts of attachments of the electric/electronic equipment. The molded article can be also applied to structural members of automobiles, airplanes, and the like, building members, food containers, and the like. That is, the molded article can be applied to various kinds of manufacturing methods of manufacturing molded articles by molding the thermoplastic resin composition by using the die.

The molded article formed by the thermoplastic resin composition of the embodiment can exhibit a high impact resistance (impact value). Specifically speaking, a Charpy impact value (its obtaining method will be described hereinafter) can be set to 5.0 or more (kJ/m$^2$). There is a case where, for example, OA equipment is manufactured by assembling parts by using the molded article formed by the thermoplastic resin composition of the embodiment, or the like. In the assembly of those parts, severer conditions such as a reduction of an assembling time and the like are demanded. In order to realize the reduction of the assembling time, it cannot help raising a conveying speed or the like of the molded article. An impact which is applied to the molded article at the time of assembling is also large. If the Charpy impact value is smaller than 5.0 (kJ/m$^2$), there is a case where a crack or breakage is caused by the impact.

Examples

Raw materials used in common in present Examples (also including Comparisons) are as follows.

(A) Impact-resistant styrene resin composition: NORYL (registered trademark) N802 (product name) made by SABIC Co., Ltd.
Dispersed rubber phase: Butadiene rubber
Fraction of the dispersed rubber phase: 22% (area fraction in the case where a phase separation structure is observed by the transmission electron microscope)
PPE content: 16%

(B) Elastomer Containing Styrene-Butadiene Copolymer
All of the following elastomers are unhydrogenated elastomers.
Elastomer containing an S-B-S triblock copolymer as a main component (Examples)
 <B-1> Thermoplastic Elastomer TR2827 (product name) made by JSR Co., Ltd.
 <B-2> Thermoplastic Elastomer TR2003 (product name) made by JSR Co., Ltd.
 <B-3> Thermoplastic Elastomer TR2250 (product name) made by JSR Co., Ltd.
 <B-4> Thermoplastic Elastomer D1101JO (product name) made by Kraton Co., Ltd.
 <B-5> Thermoplastic Elastomer D1102JSZ (product name) made by Kraton Co., Ltd.
 <B-6> Thermoplastic Elastomer DX405JOP (product name) made by Kraton Co., Ltd.
 <B-7> Thermoplastic Elastomer MD157JOP (product name) made by Kraton Co., Ltd.
 <B-8> Thermoplastic Elastomer DX408JOP (product name) made by Kraton Co., Ltd.
 <B-9> Thermoplastic Elastomer Asaprene (registered trademark) T-437L (product name) made by Asahikasei Chemicals Co., Ltd.
 <B-10> Thermoplastic Elastomer Tufprene (registered trademark) 126S (product name) made by Asahikasei Chemicals Co., Ltd.
Elastomer containing an S-B diblock copolymer as a main component (Comparisons)
 <B-11> Thermoplastic Elastomer D1118ET (product name) made by Kraton Co., Ltd.
 <B-12> Thermoplastic Elastomer D0243ET (product name) made by Kraton Co., Ltd.
Elastomer containing branch and radial structures as a main component (Comparisons)
 <B-13> Thermoplastic Elastomer TR2500 (product name) made by JSR Co., Ltd.
 <B-14> Thermoplastic Elastomer DX410JS (product name) made by Kraton Co., Ltd.

(C) Inorganic Filler
 <C-1> Calcium Carbonate NS100 (product name) made by Nitto Funka Industries Co., Ltd., mean particle diameter: 2.1 µm
 <C-2> Wollastonite K-330 (product name) made by Keiwa Rozai Co., Ltd.

<C-3> Ichi-go Talc (product name) made by Nippon Kasseki Smelting Co., Ltd.

<C-4> Mica S-325 (product name) made by REPCO, Inc., mean particle diameter: 27 μm <C-5> Silica Rock Fine Powder made by Keiwa Rozai Co., Ltd., mean particle diameter: 3.5 μm <C-6> Agalmatolite Clay Catarupo (product name) made by Takehara Kagaku Industries Co., Ltd.

(D) Additive agent: Tyrabazole (registered trademark) H-818 (product name) made by Taiyo Kagaku Co., Ltd., 50 weight % Ethanol dilute material of (main component: polyglycerol condensation fatty acid ester)

The following apparatuses are used as kneading apparatuses in Examples and Comparisons.

(E) Kneading apparatuses

<E-1> Biaxial Extruder TEX44 (product name) made by The Japan Steel Works, Ltd., cylinder temperature: 200° C.

<E-2> Biaxial Extruder PCM30 (product name) made by Ikegai Co., Ltd., cylinder temperature: 200° C.

<E-3> Compounding Tester ULTnano (product name) made by TECHNOVEL CORPORATION, cylinder temperature: 200° C.

(Manufacturing of Thermoplastic Resin Composition)

The inorganic filler (C) and the additive agent (D) are mixed at a blending ratio shown in each of Examples and Comparisons in Table 1, the impact-resistant styrene resin composition (A) and the elastomer (B) are further added, and a blended substance of raw materials which are preliminarily uniform is produced. The blended substance is melt-kneaded by the kneading apparatus (E) and strand is produced and is cut out by a pelletizer, so that a pellet of the thermoplastic resin composition is obtained.

(Manufacturing of Molding Specimen)

The obtained pellet is injection molded at a cylinder temperature of 200° C. and a die temperature of 50° C. by Injection Molding Machine SE-180D (product name) made by Sumitomo Heavy Industries, Ltd., and Strip-shaped Specimen Type B1 (length of 80 mm×width of 10 mm×thickness of 4 mm) which is specified by JIS K7152-1 is produced. With respect to such a specimen, (impact resistance test) and (molding shrinkage percentage evaluation) are performed by the following measuring method.

(Impact Resistance Test)

A notch (shape A) processing is performed to the molded article by using No. 189-PN Notch Finishing Machine (product name) made by Yasuda Seiki Co., Ltd. in accordance with JIS K7111, and an edgewise specimen is produced. A Charpy impact test is performed to such a specimen at 23° C. by using No. 258-D Digital Impact Tester (product name) made by Yasuda Seiki Co., Ltd. in accordance with JIS K7111-1. A weight of a hammer used is equal to 0.5 J and a mean value of the tests of five times is set to a Charpy impact value (impact value).

(Molding Shrinkage Percentage Evaluation)

An inner dimension of an injection molding machine die of a portion corresponding to a length in the resin flowing direction of the specimen shape is regarded as a length just after the specimen was molded. A length of specimen after one week from the molding is measured by calipers. A difference between the length just after the molding and the length after one week is divided by the length just after the molding and a resultant value is expressed by a percentage and is assumed to be a molding shrinkage percentage.

As Examples 1 to 5, results of (impact resistance test) and (molding shrinkage percentage evaluation) are summarized in Table 2 with respect to the case where the inorganic filler (C) is calcium carbonate and its concentration is set to the same condition (40 weight %) and with respect to the case where the elastomer (B) contains the triblock polymer of S-B-S as a main component. As Comparisons 1 to 5, results

TABLE 1

|  | (A) | (B) | | | (C) | | (D) | |
|---|---|---|---|---|---|---|---|---|
|  | Weight % | Kind | Main component | Weight % | Kind | Weight % | Weight % | (E) Apparatus |
| Example 1 | 47 | B-1 | Linear (S—B—S triblock) | 10 | C-1 | 40 | 3 | E-1 |
| Example 2 |  | B-4 |  |  |  |  |  | E-2 |
| Example 3 |  | B-5 |  |  |  |  |  | E-2 |
| Example 4 |  | B-6 |  |  |  |  |  | E-2 |
| Example 5 |  | B-9 |  |  |  |  |  | E-1 |
| Example 6 | 57 | B-1 |  |  |  | 30 |  | E-1 |
| Example 7 |  | B-2 |  |  |  |  |  | E-2 |
| Example 8 |  | B-3 |  |  |  |  |  | E-2 |
| Example 9 |  | B-7 |  |  |  |  |  | E-2 |
| Example 10 |  | B-8 |  |  |  |  |  | E-2 |
| Example 11 |  | B-9 |  |  |  |  |  | E-1 |
| Example 12 |  | B-10 |  |  |  |  |  | E-2 |
| Example 13 | 66 | B-5 |  |  |  | 21 |  | E-3 |
| Example 14 |  |  |  |  | C-2 |  |  | E-3 |
| Example 15 |  |  |  |  | C-3 |  |  | E-3 |
| Example 16 |  |  |  |  | C-4 |  |  | E-3 |
| Example 17 |  |  |  |  | C-5 |  |  | E-3 |
| Example 18 |  |  |  |  | C-6 |  |  | E-3 |
| Example 19 | 47 |  |  |  | C-2 | 40 |  | E-2 |
| Example 20 | 73 |  |  | 3 |  | 21 |  | E-3 |
| Example 21 | 40 |  |  | 7 |  | 50 |  | E-3 |
| Comparison 1 | 47 | B-11 | Diblock | 10 | C-1 | 40 |  | E-2 |
| Comparison 2 |  | B-12 |  |  |  |  |  | E-2 |
| Comparison 3 |  | B-13 | Branch |  |  |  |  | E-2 |
| Comparison 4 |  | B-14 | Radial |  |  |  |  | E-2 |
| Comparison 5 | 100 | — |  | 0 | — | 0 | 0 | E-2 | of (impact resistance test) and (molding shrinkage percentage evaluation) are summarized in Table 2 with respect to the case where the diblock copolymer, branch copolymer, and radial copolymer are contained as a main component and with respect to the case where the impact-resistant styrene resin composition (A) is solely used.

TABLE 2

|  | Example 1 | Example 2 | Example 3 | Example 4 | Example 5 | Comparison 1 | Comparison 2 | Comparison 3 | Comparison 4 | Comparison 5 |
|---|---|---|---|---|---|---|---|---|---|---|
| (B) Main component | Linear (S—B—S triblock) | | | | | Diblock | | Branch | Radial | — |
| Charpy impact value (kJ/m$^2$) | 6.27 | 6.65 | 6.56 | 6.24 | 6.08 | 4.88 | 4.70 | 4.98 | 4.69 | 4.88 |
| Molding shrinkage percentage (%) | 0.33 | 0.38 | 0.39 | 0.38 | 0.40 | 0.40 | 0.41 | 0.38 | 0.47 | 0.45 |

From the results shown in Table 2, in the cases of Examples 1 to 5 in which the elastomer (B) contains the triblock polymer of S-B-S as a main component, it can be confirmed that the high impact values are obtained as compared with those in the other cases of Comparisons 1 to 5. In all of Examples 1 to 5, it can be confirmed that the molding shrinkage percentage is also reduced as compared with that of the single body of the impact-resistant styrene resin composition (A) (Comparison 5) and the thermoplastic resin composition in which a physical balance of the impact resistance and the molding shrinkage percentage is excellent is obtained.

With respect to the cases of Examples 6 to 12 in which the elastomer (B) contains the triblock polymer of S-B-S, relations of (impact resistance test) are summarized in Table 3 by paying an attention to the tensile elongation at break of the elastomer (B) single body. The tensile elongation at break can be measured by a well-known testing method (ASTM testing method D412 under conditions of the tensile speed of 10 inches/min and 23° C.) and can be also known from the numerical values opened to a catalogue of each elastomer (B) product.

TABLE 3

|  | Example 6 | Example 7 | Example 8 | Example 9 | Example 10 | Example 11 | Example 12 |
|---|---|---|---|---|---|---|---|
| (B) Main component | Linear (S—B—S triblock) | | | | | | |
| Tensile elongation at break (%) of (B) | 1040 | 690 | 700 | 600 | 690 | 890 | 790 |
| Charpy impact value (kJ/m$^2$) | 7.06 | 6.07 | 5.47 | 6.47 | 6.07 | 8.26 | 5.97 |

From results of Examples 6 to 12 shown in Table 3, if the tensile elongation at break has 600% or more, it can be confirmed that high impact values are obtained as compared with those in Comparisons 1 to 5 shown in Table 2. From Examples 6 and 11, if the tensile elongation at break has 890% or more, it can be confirmed that particularly high impact values are obtained as compared with those in other Examples.

Results of (impact resistance test) and (molding shrinkage percentage evaluation) are summarized in Table 4 with respect to a case where the kind of inorganic filler (C) is changed.

TABLE 4

|  | Example 13 | Example 14 | Example 15 | Example 16 | Example 17 | Example 18 | Example 19 | Example 20 | Example 21 |
|---|---|---|---|---|---|---|---|---|---|
| (B) Main component | Linear (S—B—S triblock) | | | | | | | | |
| (B) weight % | | | | 10 | | | | 3 | 7 |
| (C) Kind | C-1 | C-2 | C-3 | C-4 | C-5 | C-6 | | C-2 | |
| (C) Weight % | | | | 21 | | | 40 | 21 | 50 |
| Charpy impact resistance (kJ/m$^2$) | 7.93 | 8.59 | 5.79 | 4.98 | 5.04 | 5.21 | 7.05 | 4.94 | 5.08 |
| Molding shrinkage percentage (%) | 0.45 | 0.38 | 0.43 | 0.39 | 0.45 | 0.45 | 0.29 | 0.25 | 0.31 |

When comparing Examples 13 to 18 in which items other than the kind of inorganic filler (C) are the same conditions among Examples in Table 4, it can be confirmed that the thermoplastic resin composition has particularly excellent impact resistance in the case where the inorganic filler (C) is calcium Carbonate (C-1) or wollastonite (C-2). From results of Examples 14 and 19 to 21 shown in Table 4, it can be confirmed that the thermoplastic resin composition exhibits a particularly excellent molding shrinkage percentage in the case where the inorganic filler (C) is wollastonite (C-2).

(Phase Structure Observation of Thermoplastic Resin Composition)

Figure 4:
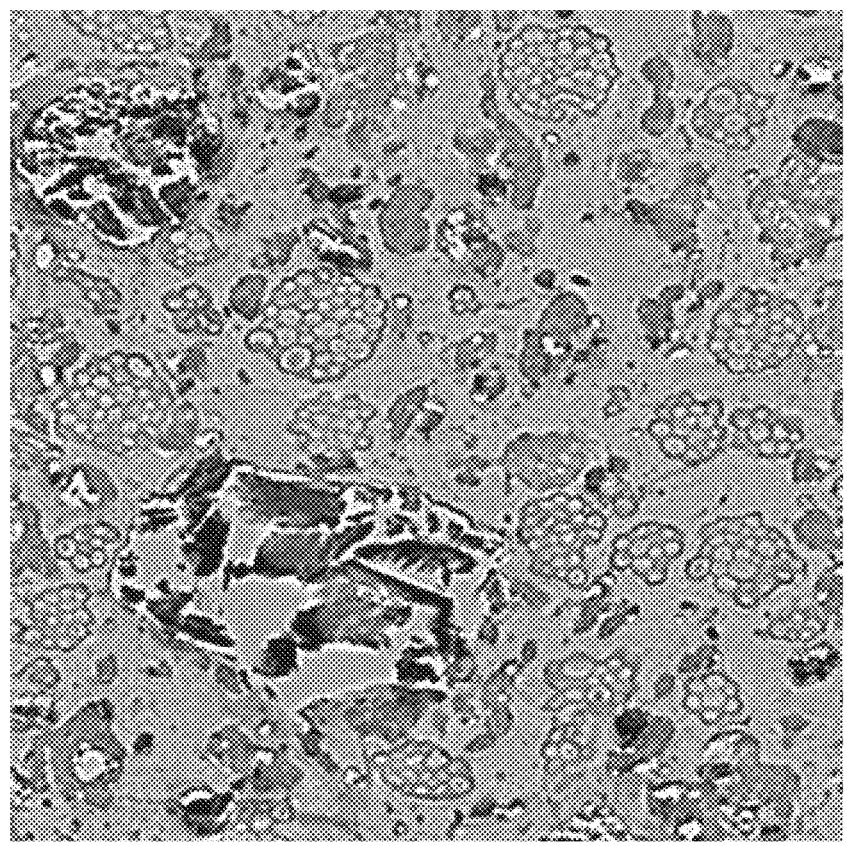
FIG. 4 is a diagram illustrating an image obtained by observing a cross section of a thermoplastic resin composition of Comparison by an electron microscope.

An ultrathin slice obtained by executing the two-stage dyeing step using ruthenium tetroxide and osmium tetroxide and the step of forming the ultrathin slice of 100 nm under the liquid nitrogen freezing condition is evaporation deposited by carbon or the like. The ultrathin slice is photographed at a magnification of 10000 times under an accelerating voltage condition of 100 kV by the transmission electron microscope H-8100 (product name) made by Hitachi Hightech Co., Ltd. Further, by cutting out an angle of field of a square of 10 μm in the photographed image, a structure of the thermoplastic resin composition containing a resin phase structure is observed. FIG. 2 described in the foregoing embodiment is a diagram illustrating an image obtained by observing a cross section of the thermoplastic resin composition of Example 1 by the electron microscope. FIG. 4 is a diagram illustrating an image obtained by observing a cross section of a thermoplastic resin composition of comparison 2 by the electron microscope.

In order to evaluate a contacting area of the elastomer (B) and the inorganic filler (C), a portion of the inorganic filler which is not chemically dyed, a portion of the dispersed rubber phase which was secondary-dyed, and a portion of the styrene-butadiene copolymer are cut out and an area of each of the cut-out portions is calculated by an image process. A result obtained by image-processing FIG. serving as an image of Example 1 is illustrated as an example in FIG. 3. In the calculation of the areas by the image process, Image-Pro plus (product name) made by Media Cybernetics Co., Ltd. is used.

When the cross section of the ultrathin slice serving as an observation target is formed, the inorganic filler falls out and a noise is confirmed in the fallout block. However, since an undyed contour is observed in the fallout block, an area in a range of such a contour is also included in the area of the inorganic filler (C). In the case where the dispersed rubber phase contained in the impact-resistant styrene resin composition (A) is contact-wrapped to the dispersed phase of the elastomer (B), an area of the contact-wrapped dispersed rubber phase is included in the area of the dispersed phase of the styrene-butadiene copolymer.

A total area of the dispersed phase of the elastomer (B) which is in contact with the inorganic filler (C) at the time when a total area of the inorganic filler (C) is assumed to be 1 is obtained and is set to X. A total area of the dispersed phase of the elastomer (B) which is in contact with the inorganic filler (C) at the time when a total area of the dispersed phase (the dispersed phase which is in contact with the inorganic filler and the dispersed phase which is not in contact with the inorganic filler) of the elastomer (B) is assumed to be 1 is obtained and is set to Y. Results are shown in Table 4 with respect to typical ones of Examples 1 to 12 and Comparisons 1 to 5, specifically speaking, with respect to Examples 1, 3, 5, and 11 and Comparisons 2 and 4.

TABLE 5

| | Example 1 | Example 3 | Example 5 | Example 11 | Example 19 | Example 20 | Comparison 2 | Comparison 4 |
|---|---|---|---|---|---|---|---|---|
| (B) Main component | Linear (S—B—S triblock) | | | | | | Diblock | Radial |
| X | 0.37 | 0.30 | 0.33 | 0.27 | 0.40 | 0.20 | 0.17 | 0.16 |
| Y | 0.29 | 0.25 | 0.20 | 0.18 | 0.31 | 0.27 | 0.14 | 0.13 |
| Charpy impact resistance (kJ/m$^2$) | 6.27 | 6.56 | 6.08 | 8.26 | 7.05 | 4.94 | 4.70 | 4.69 |
| Molding shrinkage percentage (%) | 0.33 | 0.39 | 0.40 | 0.45 | 0.29 | 0.25 | 0.41 | 0.47 |

In Examples 1, 3, 5, 11, 19, and 20 shown in Table 5, X lies within a range between 0.20 or more and 0.40 or less. According to the structures of Examples 1, 3, 5, 11, 19, and 20, it can be confirmed that the stress which is generated at the interface between the resin and the inorganic filler can be more efficiently relieved and a thermoplastic resin composition in which an impact value is high (the impact resistance is improved) is obtained.

In Examples 1, 3, 5, 11, 19, and 20 shown in Table 4, Y lies within a range between 0.18 or more and 1 or less. In Examples 1, 3, 5, 11, 19, and 20, since such an efficient layout that a larger amount of elastomer (B) component is adjacent to the inorganic filler (C) is formed, it can be confirmed that a thermoplastic resin composition in which an impact value is high and a molding shrinkage percentage is small is obtained.

The present invention is not limited to the above-described embodiments and Examples but many modifications are possible within a technical idea of the invention. The effects disclosed in the embodiments and Examples of the invention are nothing but the most suitable effects derived from the present invention. The effects by the invention are not limited to the effects disclosed in the embodiments and Examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-093455, filed May 6, 2016, and Japanese Patent Application No. 2017-079088, filed Apr. 12, 2017, which are hereby incorporated by reference herein in their entirety.

What is claimed is:

1. A thermoplastic resin composition comprising:
an impact-resistant styrene resin composition which contains polystyrene as a main component and a dispersed rubber phase and in which a volume fraction of the dispersed rubber phase is less than 30%;
elastomer, which contains a styrene-butadiene copolymer at a content of more than 50 weight % based on a total weight of the elastomer; and
an inorganic filler,
wherein the styrene-butadiene copolymer contains, as a main component, a linear copolymer constructed by a triblock consisting of a butadiene block and styrene blocks coupled with both ends of the butadiene block, and
wherein, based on a total weight of the thermoplastic resin composition, a content of the impact-resistant styrene resin composition is 40 weight % to less than 80 weight %, a content of the elastomer is more than 0 weight % to 10 weight %, and a content of the inorganic filler is more than 20 weight % to 50 weight %.

2. The composition according to claim 1, wherein in a cross section of the thermoplastic resin composition, assuming that a total area of the inorganic filler is equal to 1, among dispersed phases of the elastomer, a total area of the dispersed phases of the elastomer which are in contact with the inorganic filler is 0.27 to 0.37.

3. The composition according to claim 1, wherein in a cross section of the thermoplastic resin composition, assuming that a total area of all of the dispersed phases of the elastomer is equal to 1, among the dispersed phases of the elastomer, a total area of the dispersed phases of the elastomer which are in contact with the filler is 0.18 to 1.

4. The composition according to claim 1, wherein a tensile elongation at break of the elastomer is equal to 600% or more.

5. The composition according to claim 4, wherein the tensile elongation at break of the elastomer is equal to 890% or more.

6. The composition according to claim 1, wherein the inorganic filler contains calcium carbonate.

7. The composition according to claim 1, wherein the content of the elastomer is 3 weight % to 10 weight %.

8. A molded article, wherein the molded article is formed from the thermoplastic resin composition according to claim 1.

9. The molded article according to claim 8, wherein a Charpy impact value is equal to 5.0 or more ($kJ/m^2$).

10. An electronic apparatus comprising the molded article according to claim 8.

11. The composition according to claim 1, wherein a hydrogenation ratio of the styrene-butadiene copolymer is less than 5%.

* * * * *